(12) United States Patent
Kashiwagi et al.

(10) Patent No.: US 8,842,247 B2
(45) Date of Patent: Sep. 23, 2014

(54) OPTICAL DEVICE AND IMAGE DISPLAY DEVICE

(75) Inventors: Masako Kashiwagi, Kanagawa (JP); Shinichi Uehara, Tokyo (JP); Ayako Takagi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/550,780

(22) Filed: Jul. 17, 2012

(65) Prior Publication Data

US 2013/0222742 A1 Aug. 29, 2013

(30) Foreign Application Priority Data

Feb. 28, 2012 (JP) ................................. 2012-042244

(51) Int. Cl.
*G02F 1/1343* (2006.01)
(52) U.S. Cl.
USPC ............................. 349/141; 349/142; 349/10
(58) Field of Classification Search
CPC ..................... G02F 1/134327; G02F 1/134363
USPC .................... 349/15, 110, 141–142
See application file for complete search history.

(56) References Cited

U.S. PATENT DOCUMENTS

2008/0007684 A1* 1/2008 Kim ............................. 349/143
2009/0015739 A1 1/2009 Shin et al.

FOREIGN PATENT DOCUMENTS

| JP | 2003-186036 | 7/2003 |
| JP | 3940725 | 4/2007 |
| WO | WO 2013/084319 A1 | 6/2013 |

OTHER PUBLICATIONS

Notice of Rejection issued by the Japanese Patent Office on Jun. 3, 2014, for Japanese Patent Application No. 2012-042244, and English-language translation thereof.
Kashiwagi et al., U.S. Appl. No. 14/296,720, filed Jun. 5, 2014.

\* cited by examiner

*Primary Examiner* — Phu Vu
(74) *Attorney, Agent, or Firm* — Finnegan, Henderson, Farabow, Garrett & Dunner, L.L.P.

(57) ABSTRACT

In an embodiment, an optical device includes a first substrate; a second substrate; a liquid crystal layer; a plurality of first electrodes; a second electrode; and a light shielding portion. The liquid crystal layer provided between the first substrate and the second substrate. The plurality of first electrodes is provided on the first substrate and arranged in a first direction, extending in a second direction. The second electrode is provided on the second substrate. The light shielding portion is configured to be provided at a position between the first substrate and the second substrate to overlap with the first electrodes when viewed from the third direction. The light shielding portion covers a less space than the first electrodes.

18 Claims, 9 Drawing Sheets

OPTICAL DEVICE AND IMAGE DISPLAY DEVICE

CROSS-REFERENCE TO RELATED APPLICATIONS

This application is based upon and claims the benefit of priority from Japanese Patent Application No. 2012-042244, filed on Feb. 28, 2012; the entire contents of which are incorporated herein by reference.

FIELD

Embodiments described herein relate generally to an optical device and an image display device.

BACKGROUND

In liquid crystal GRIN (gradient index) lenses using rod-shaped electrodes, the orientation disorder (disclination) is likely to occur when voltage for realizing a phase difference distribution as lenses is applied to the electrodes (lens end electrodes). Disclination causes stray light, and increases the crosstalk. Means for reducing stray light is thus needed. Therefore, in order to reduce the crosstalk, a technique of providing a light shield portion that is wider than the width of lens electrodes beneath the lens electrodes is proposed.

The technique of the related art, however, has a disadvantage that the lenses are shielded more than necessary by the light shielding portion that is wider than the lens electrode width and the luminance is thus lowered.

DETAILED DESCRIPTION

In an embodiment, an optical device includes a first substrate; a second substrate; a liquid crystal layer; a plurality of first electrodes; a second electrode; and a light shielding portion. The liquid crystal layer provided between the first substrate and the second substrate. The plurality of first electrodes is provided on the first substrate and arranged in a first direction, extending in a second direction. The second electrode is provided on the second substrate. The light shielding portion is configured to be provided at a position between the first substrate and the second substrate to overlap with the first electrodes when viewed from the third direction. The light shielding portion covers a less space than the first electrodes.

Preferred embodiments of an optical device and an image display device according to an aspect of the invention will be described below in detail with reference to the accompanying drawings.

First Embodiment

As described above, with the method of the related art, there has been a disadvantage that the lenses are shielded more than necessary by the wide light shielding portion and the luminance is thus lowered. Moreover, the influence of the light shielding portion remains even in a 2D display mode in which voltage is not applied to the lens electrodes. With the large light shielding portion as in the method of the related art, the parallax barrier effect as in a barrier 3D display is produced and light beams are split. Thus, the 3D characteristics remains even in a 2D display mode. Moreover, a strong barrier effect results in occurrence of moiré and thus decreases the 2D image quality. As described above, with the method of the related art, there has been a disadvantage that the color separation characteristics remain even in the 2D display and the 2D image quality is deteriorated.

An optical device and an image display device according to the first embodiment include a light shielding portion (a region with a lower transmittance than lens end electrodes) having an area equal to or smaller than that of lens electrodes of a liquid crystal GRIN lens and provided at end portions of the lens electrodes. As will be described later, disclination occurs near edges of the lens electrodes to which a high voltage is applied. Thus, the light shielding portion that has a minimum area corresponding to the disclination is provided to prevent the luminance from lowering.

Figure 1:
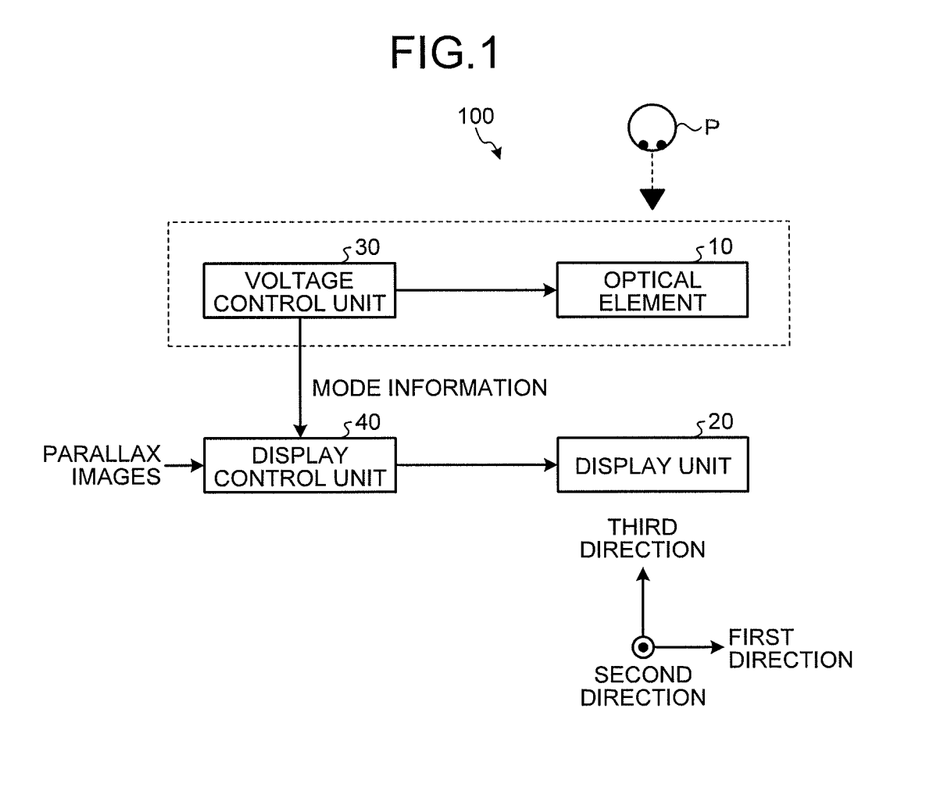
FIG. 1 is a block diagram illustrating an image display device according to a first embodiment.

FIG. 1 is a block diagram illustrating an exemplary configuration of an image display device 100 according to the present embodiment. The image display device 100 is a device capable of displaying stereoscopic images (three-dimensional images). The image display device 100 is also capable of displaying planar images (two-dimensional images) and switching between display of three-dimensional images and display of two-dimensional images.

As illustrated in FIG. 1, the image display device 100 includes an optical element 10, a display unit 20, a voltage control unit 30 and a display control unit 40. A viewer P can recognize stereoscopic images or the like displayed on the display unit 20 by viewing the display unit 20 through the optical element 10. In FIG. 1, a part surrounded by a dotted line (the optical element 10 and the voltage control unit 30) corresponds to an optical device.

The optical element 10 has a refractive index distribution that changes according to the voltage applied thereto. Light beams entering the optical element 10 from the display unit 20 are emitted toward directions according to the refractive index distribution of the optical element 10. While a case in which the optical element 10 is a liquid crystal GRIN (gradient index) lens array will be described in the present embodiment, the optical element 10 is not limited thereto. The detailed configuration of the optical element 10 according to the present embodiment will be described later, and the optical element 10 according to the present embodiment includes at least a liquid crystal layer having a refractive index distribution that changes according to the voltage applied thereto and a plurality of electrodes (lens electrodes) that can apply voltage to the liquid crystal layer. The display unit 20 is provided on a back face of the optical element 10 and displays images. For example, the display unit 20 displays parallax images used for displaying stereoscopic images. The display unit 20 may have a known configuration in which sub-pixels of R, G and B, where R, G and B correspond to one pixel, are arranged in a matrix, for example. The respective pixels of the display unit 20 are assigned with parallax images supplied from the display control unit 40 under the control of the display control unit 40. Light beams from the pixels are emitted toward directions according to the refractive index distribution of the liquid crystal GRIN lenses formed to correspond to the pixels. The array of the sub-pixels of the display unit 20 may be another known array. Furthermore, the colors of the sub-pixels are not limited to three colors of R, G and B. For example, four or more colors may be used.

The voltage control unit 30 controls the voltage applied to the electrodes of the optical element 10. For example, the voltage control unit 30 receives an input specifying a mode representing a state of the voltage to be applied to the electrodes of the optical element 10, and sets the mode indicated by the received input. From a different point of view, a mode can be regarded as representing the type of display of images or the type of the refractive index distribution of the optical element 10. The voltage control unit 30 controls the voltage to be applied to the electrodes of the optical element 10 so that the mode indicated by the received input is set.

The voltage control unit 30 also sends mode information that can identify the mode indicated by the received input to the display control unit 40. Any types and any number of modes can be set. In addition, any method for setting the modes can be used, and a configuration in which the modes are automatically switched according to the number of viewers of three-dimensional images, for example, may be used. The mode may be controlled over the whole area of the optical element 10 or the voltage may be controlled so that different modes are set in different areas of the optical element 10. For example, a certain mode may be a mode in which lenses are formed in specific areas of the optical element 10 while lenses are not formed in the other areas thereof.

The display control unit 40 controls the display unit 20 to display images (such as parallax images). In the present embodiment, the display control unit 40 refers to mode information sent from the voltage control unit 30, obtains images (such as parallax images) to be displayed in the mode specified by the mode information, and controls the display unit 20 to display the obtained images.

Figure 2:
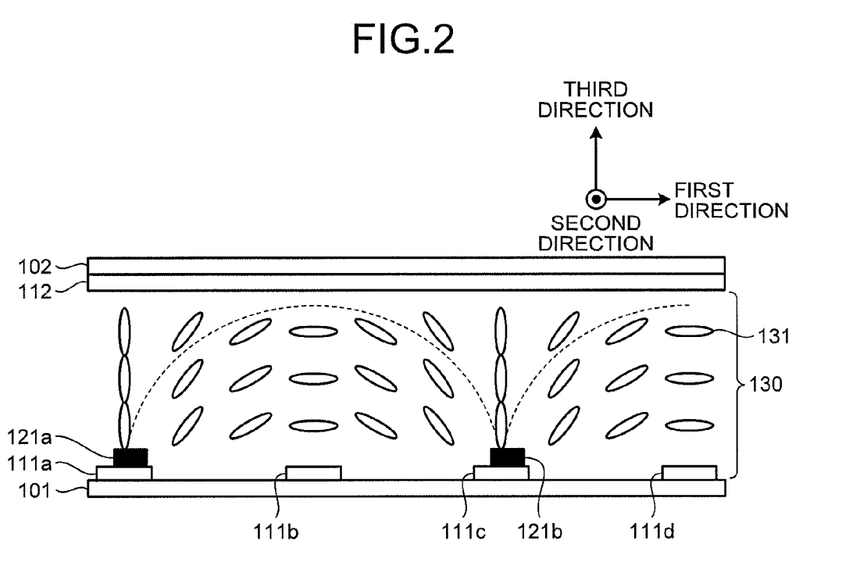
FIG. 2 is a cross sectional view of an optical element according to the first embodiment.

FIG. 2 is a cross sectional view of the optical element 10 according to the present embodiment. FIG. 2 illustrates a cross section along a plane perpendicular to the second direction in FIG. 1. The optical element 10 includes a first substrate 101, a second substrate 102, a liquid crystal layer 130, a plurality of first electrodes 111a, 111b, 111c and 111d, a plurality of light shielding portions 121a and 121b, and a second electrode 112.

The second substrate 102 is opposed to the first substrate 101 and arranged at a position at which the thickness of the liquid crystal layer 130 in the third direction is controlled. The liquid crystal layer 130 is held between the first substrate 101 and the second substrate 102.

The first electrodes 111a, 111b, 111c and 111d are arranged on the first substrate 101 on the side of the liquid crystal layer 130 and apply voltage to the liquid crystal layer 130. In the following description, the first electrodes may be simply referred to as first electrodes 111 when it is not necessary to distinguish individual first electrodes. Although FIG. 2 illustrates four first electrodes 111, the number of first electrodes 111 is not limited to four.

Figure 3:
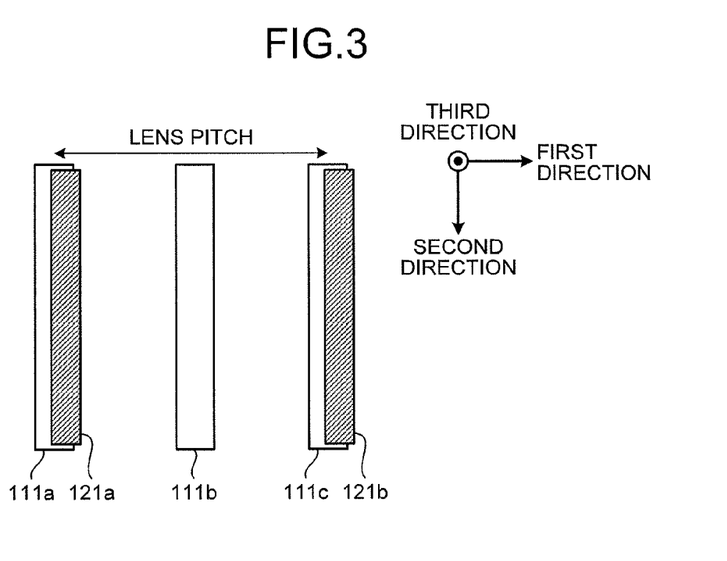
FIG. 3 is a diagram illustrating an example of arrangement of first electrodes according to the first embodiment.

FIG. 3 is a diagram illustrating an example of arrangement of the first electrodes 111 according to the first embodiment. As illustrated in FIG. 3, a plurality of first electrodes 111 is arranged along the first direction and extends along the second direction. The first electrodes 111 may alternatively arranged to extend in a direction other than the direction (the second direction) perpendicular to the first direction.

The light shielding portions 121a and 121b block light beams incident on parts where disclination occurs. In the following description, the light shielding portions may be simply referred to as light shielding portions 121 when it is not necessary to distinguish individual light shielding portions. Although FIGS. 2 and 3 illustrate two light shielding portions 121, the number of light shielding portions 121 is not limited to two.

The light shielding portions 121 are made of a material having lower transmittance than the first electrodes 111, for example. For example, the light shielding portions 121 may be formed similarly to a black matrix that is used as a light shielding pattern of a display device. As illustrated in FIG. 3, the light shielding portions 121 are formed at positions overlapping with those of the first electrodes 111 as viewed in the third direction and with areas as viewed in the third direction smaller than those of the first electrodes 111.

FIGS. 2 and 3 illustrate an example in which the light shielding portions 121 are formed on the first electrodes 111. The light shielding portions 121 may alternatively be provided between the first electrodes 111 and the first substrate 101.

The description refers back to FIG. 2 in which the second electrode 112 is arranged on the second substrate 102 on the side of the liquid crystal layer 130 so as to be opposed to the first electrodes 111. As a resulting of providing the second electrode 112, the vertical electric field can also be applied to for the refractive index concentration. Alternatively, the second electrode 112 may not be included. In the following description, an example in which the second electrode 112 is not included will be mainly described. Alternatively, the second electrode 112 may be formed as a pattern of a plurality of electrodes instead of being formed as one electrode. The pattern may be in a direction perpendicular, horizontal or at any other angle with respect to the first direction.

Next, an example of the operation of the optical element 10 having such a configuration will be described. The refractive index distribution of the liquid crystal layer 130 changes according to the voltage applied to the first electrodes 111.

Light beams entering to the side of the first substrate 101 travel toward directions according to the refractive index distributions and exit from the second substrate 102. In a case of uniaxial liquid crystal, the refractive index with respect to polarized light in the same direction as the orientation of liquid crystal molecules 131 varies depending on the tilt angle $\theta_{tilt}$ of the liquid crystal molecules 131. When an electric field is applied to the liquid crystal, the liquid crystal is oriented along the direction of the electric field. The tilt angle $\theta_{tilt}$ of the liquid crystal molecules 131 is represented as an angle in the long axis direction of the liquid crystal molecules 131 with respect to the third direction.

The voltage control unit 30 applies voltage for producing a desired refractive index distribution to the first electrodes 111. While liquid crystal GRIN lenses in which the refractive index distribution corresponds to the lens array is described in the present embodiment, the refractive index distribution is not limited to the lens array.

If positive liquid crystal is used, the voltage control unit 30 controls the voltage as follows so as to obtain a refractive index distribution in a lens array. The voltage control unit 30 controls the voltage to be applied to the first electrodes 111 so that the voltage applied to first electrodes 111 (also referred to as lens end electrodes; first electrodes 111a and 111c in the example of FIG. 2) arranged at positions corresponding to end portions of the liquid crystal GRIN lenses will be maximum and the voltage applied to first electrodes 111 (first electrodes 111b and 111d in the example of FIG. 2) nearer to the lens centers will be smaller.

When a high voltage is applied, the electric field distribution is likely to expand laterally in an arch shape. In addition, orientation disorder (disclination) of the liquid crystal is likely to occur in the boundary parts of the laterally expanding electric field distribution. Disclination is a phenomenon in which the liquid crystal tilts in various directions. When light beams enter a part where disclination occurs, the light beam directions cannot be controlled to one direction and the light beams exit as stray light. This stray light causes crosstalk in 3D display.

Figure 4:
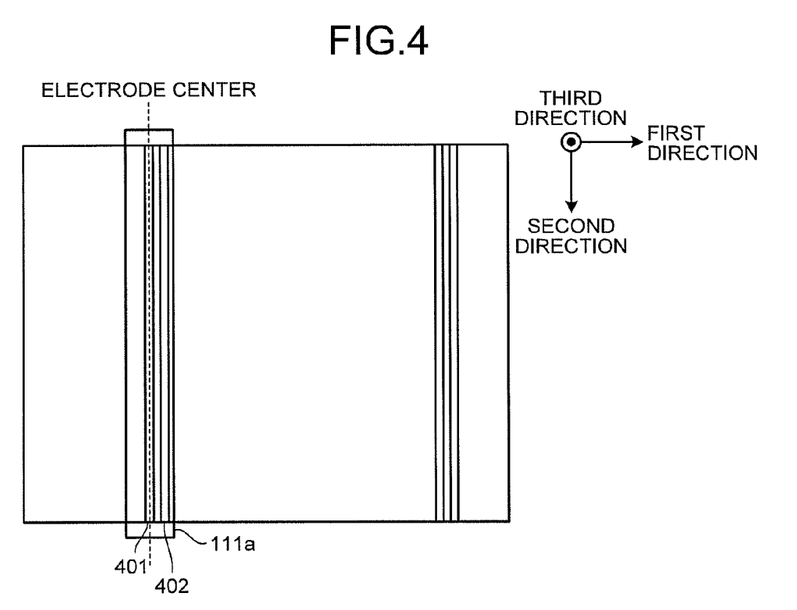
FIG. 4 is a conceptual diagram of disclination.
Figure 5:
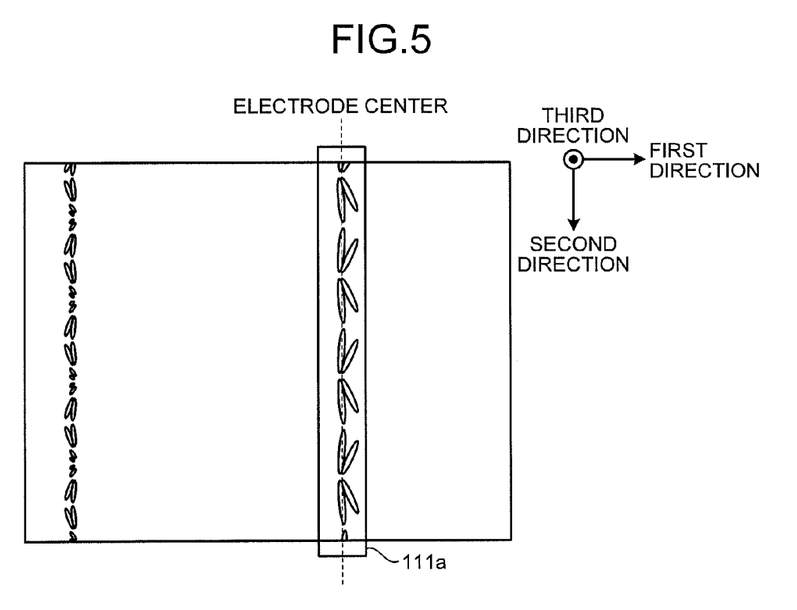
FIG. 5 is a conceptual diagram of disclination.

FIGS. 4 and 5 are conceptual diagrams for explaining examples of disclination. FIG. 4 illustrates an example of linear disclination. Disclination occurs at a part including areas 401 and 402. FIG. 5 illustrates an example of curved disclination. Both in FIGS. 4 and 5, disclination occurs on the side of the first direction with respect to the center position (electrode center) in the first direction of the first electrodes 111.

This is because disclination occurs much more in the direction in which the electric field is applied in the direction opposite to the pretilt direction of the orientation of the liquid crystal molecules 131. Accordingly, the center (shielding center) of the light shielding portions 121 is shifted to a direction nearer to the pretilt direction with respect to the center (electrode center) of the first electrodes 111. As a result, stray light can be efficiently removed.

Figure 6:
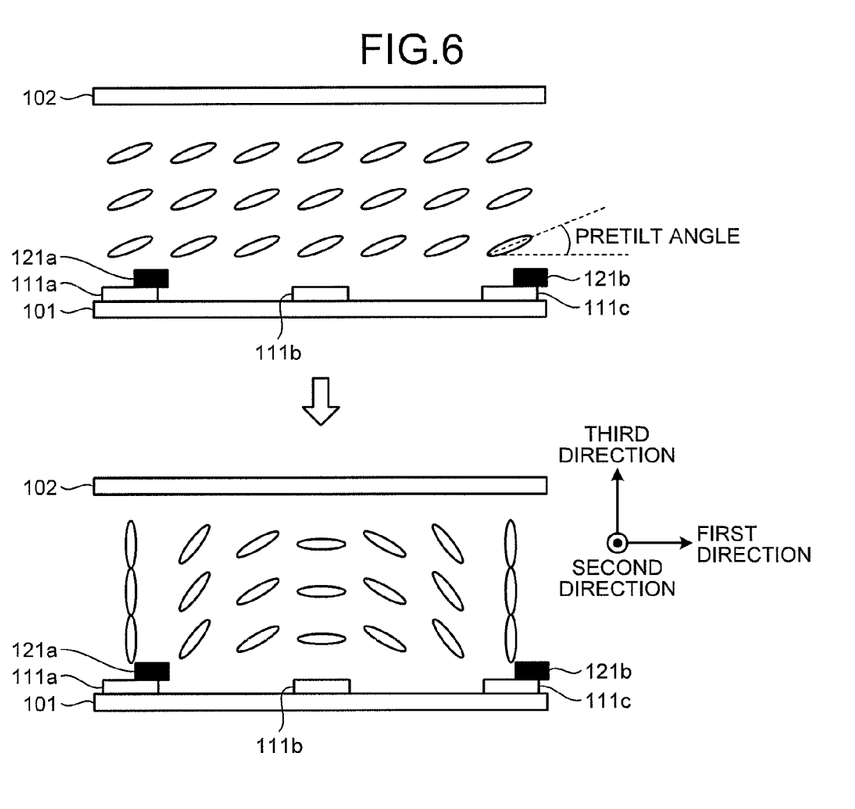
FIG. 6 is a diagram for explaining a pretilt direction of liquid crystal molecules.

FIG. 6 is a diagram for explaining the pretilt direction (pretilt angle) of the liquid crystal molecules 131. As illustrated in an upper part of FIG. 6, the liquid crystal molecules 131 tilt at a predetermined pretilt angle before application of voltage. As illustrated in a lower part of FIG. 6, the liquid crystal molecules 131 are oriented to form a liquid crystal GRIN lens array when the voltage is applied.

Figure 7:
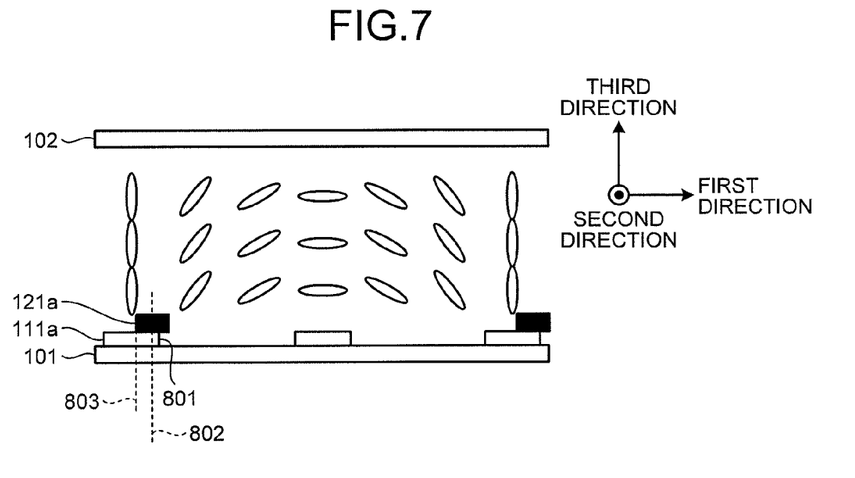
FIG. 7 is a diagram illustrating a positional relation between a first electrode and a light shielding portion.

FIG. 7 is a diagram illustrating a positional relation between a first electrode 111 and a light shielding portion 121. As illustrated in FIG. 7, the light shielding portion 121a is arranged so that a shielding center 802 that is a center position in the first direction of the light shielding portion 121a is positioned nearer to the pretilt direction (nearer to a first electrode end 801) with respect to an electrode center 803 that is the center of the first electrode 111a. Thus, in the example of FIGS. 6 and 7, the light shielding portion 121a is arranged so that the shielding center 802 is shifted from the electrode center 803 in the first direction that is nearer to the pretilt direction out of the first direction and the direction opposite to the first direction.

As described above, disclination of liquid crystal is likely to be caused by a composite electric field of a vertical electric field and a horizontal electric field in the vicinity of an electrode to which a high voltage is applied. When light beams enter a part where disclination occurs, the light beams exit in multiple directions and stray light is thus increased. In the optical device and the image display device in the first embodiment, light shielding portions are provided only at positions where stray light is generated. As a result, light beams are blocked only at parts where light shielding is necessary, and it is possible to reduce luminance lowering and reduce the visibility of stray light. Moreover, the color separation characteristics in 2D display can be reduced.

MODIFIED EXAMPLE 1

Figure 8:
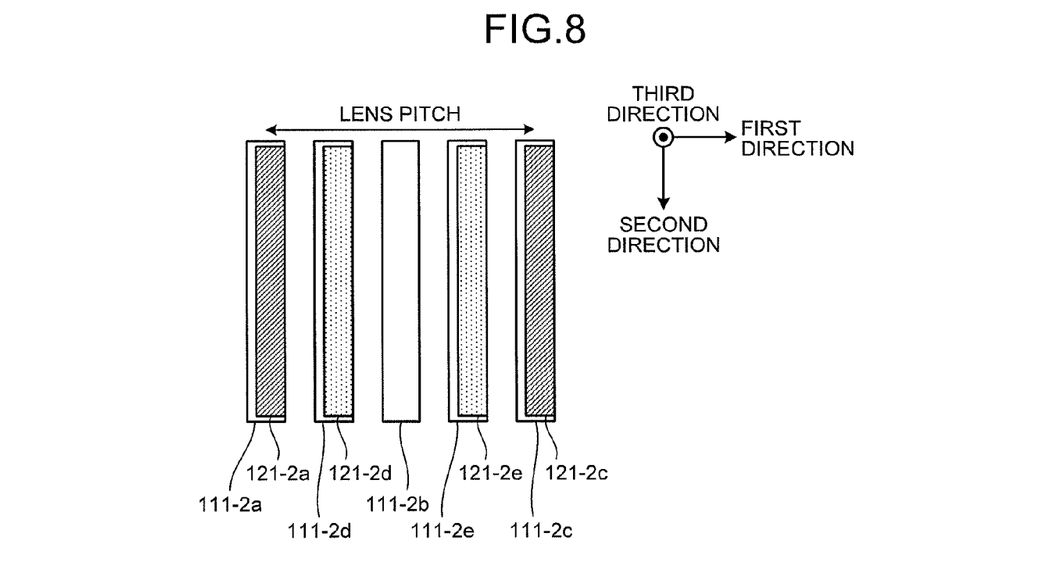
FIG. 8 is a diagram illustrating an example of arrangement of first electrodes according to a modified example 1.

FIG. 8 is a diagram illustrating an example of arrangement of first electrodes in an optical element according to a modified example 1. As illustrated in FIG. 8, the optical element according to the present modified example includes electrodes (first electrodes 111-2d and 111-2e) to which a voltage lower than that to lens end electrodes (first electrodes 111-2a and 111-2c) is applied between an electrode (first electrode 111-2b) near the lens center and the lens end electrodes.

In addition, the optical element according to the present modified example include light shielding portions 121 having a lower transmittance as the light shielding portions 121 are nearer to an electrode to which a higher voltage is applied. In FIG. 8, light shielding portions 121-2a and 121-2c corresponding to the first electrodes 111-2a and 111-2c have a lower transmittance than light shielding portions 121-2d and 121-2c corresponding to the first electrodes 111-2d and 111-2e. With such a configuration as in FIG. 8, stray light can be removed more efficiently.

MODIFIED EXAMPLE 2

Figure 9:
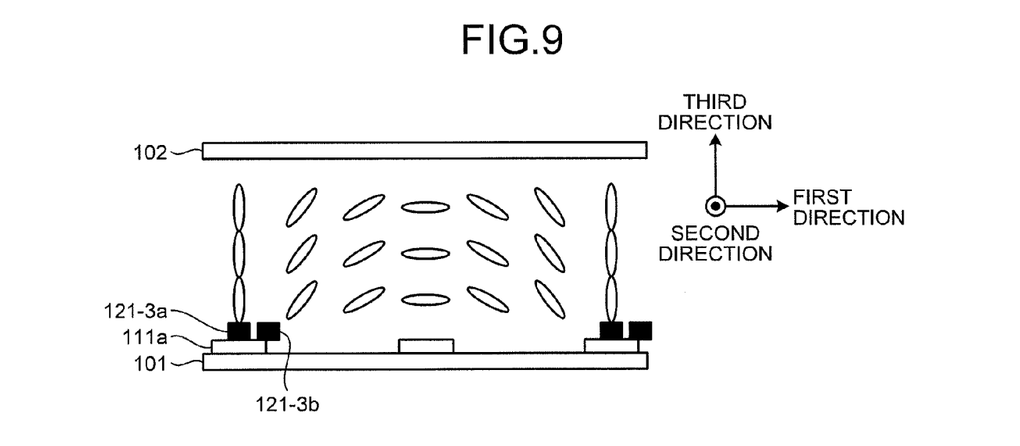
FIG. 9 is a diagram illustrating an example of arrangement of first electrodes according to a modified example 2.

FIG. 9 is a diagram illustrating an example of arrangement of first electrodes in an optical element according to a modified example 2. The optical element according to the present modified example includes a plurality of light shielding portions 121-3a and 121-3b arranged along the first direction near first electrodes 111.

Since a horizontal electric field expands laterally in an arch shape near lens boundaries of lens end electrodes, an area where severe disclination occurs is divided into two. FIGS. 4 and 5 described above illustrate example in which the areas where disclination occurs are divided into two in this manner. In the present modified example, two light shielding portions 121-3a and 121-3b are therefore arranged in the first direction to correspond to the two parts of disclination. With such a configuration as in FIG. 9, stray light can be removed more efficiently.

MODIFIED EXAMPLE 3

When light propagates through the liquid crystal layer 130, stray light may be generated at a part near the second substrate 102 in a case of light entering obliquely. In order to remove stray light due to such oblique incidence, it is preferable to provide light shielding portions also on the side of the second substrate 102. An optical element according to a modified example 3 therefore includes light shielding portions also on the side of the second substrate 102.

Figure 10:
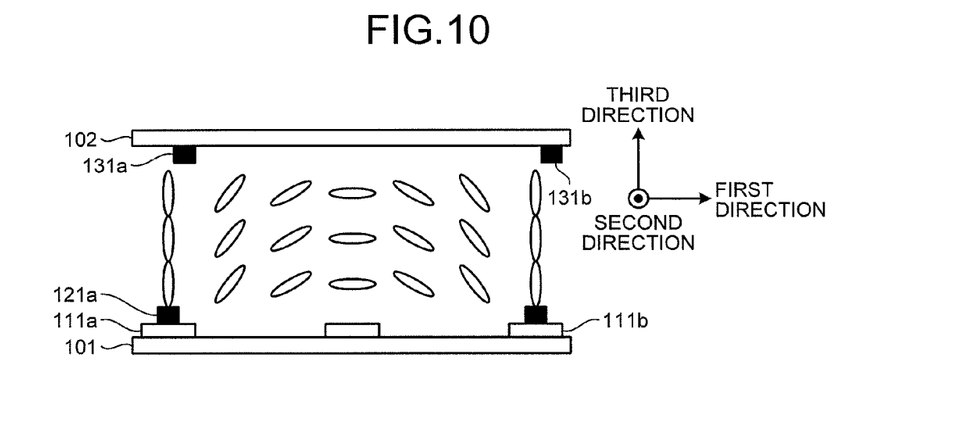
FIG. 10 is a diagram illustrating an example of arrangement of first electrodes according to a modified example 3.

FIG. 10 is a diagram illustrating an example of arrangement of first electrodes in the optical element according to the modified example 3. As illustrated in FIG. 10, the optical element according to the present modified example includes light shielding portions 131a and 131b on the second substrate 102 on the side of the liquid crystal layer 130. As a result, it is possible to efficiently remove stray light due to oblique light.

While an example in which a light shielding portion 121a is also provided on the side of the first substrate 101 is illustrated in FIG. 10, the light shielding portions 131a and 131b may be provided only on the side of the second substrate 102. In the case where disclination is divided into two as illustrated in FIG. 9, the positions of the light shielding portions 121 and the light shielding portions 131a and 131b in the first direction as viewed in the third direction may be shifted so that the positions correspond to the respective parts of disclination.

Second Embodiment

The rate of disclination is lower at a position nearer to the lens center along the first direction from lens ends owing to the application of an electric field. An optical device and an image display device according to the second embodiment therefore include light shielding portions having transmittances that vary by gradation along the first direction.

Figure 11:
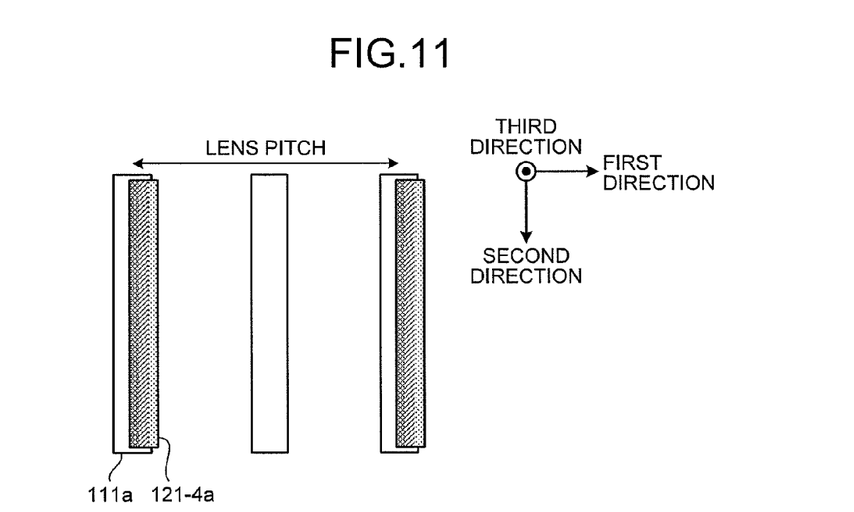
FIG. 11 is a configuration diagram of a light shielding portion of a second embodiment.

FIG. 11 is a diagram illustrating an example of a configuration of light shielding portions 121-4a according to the second embodiment. Since the configuration other than that of the light shielding portions 121-4a is similar to that in the first embodiment, the description thereof will not be repeated. As illustrated in FIG. 11, an optical element according to the present embodiment includes the light shielding portions 121-4a having transmittance that vary continuously or gradually. For example, the light shielding portions 121-4a have a lower transmittance as the position thereof is nearer to the lens center in the first direction from lens ends.

As a result, it is possible to efficiently block light according to the occurrence rate of disclination and to improve the luminance. In addition, it is possible to reduce the visibility of the light shielding portions even in a state where voltage is not applied.

Third Embodiment

Figure 12:
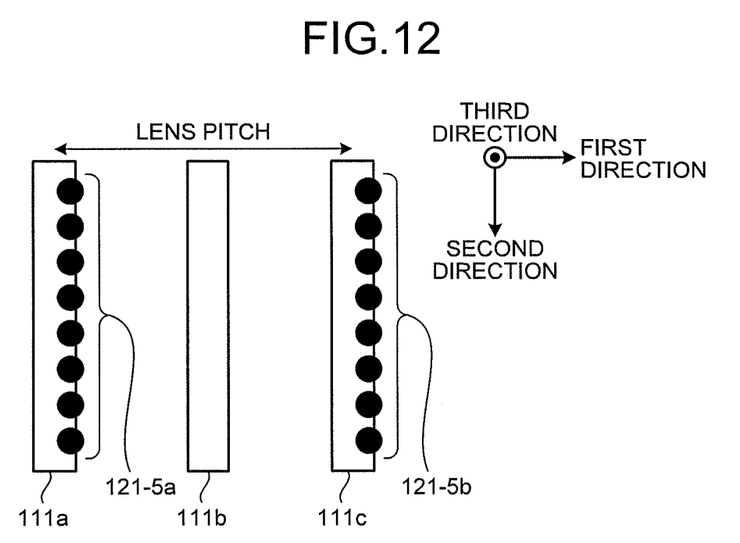
FIG. 12 is a configuration diagram of a light shielding portion of a third embodiment.

In a third embodiment, a plurality of light shielding portions formed in dots and arranged along the second direction is provided. FIG. 12 is a diagram illustrating an example of a configuration of light shielding portions 121-5a and 121-5b according to the third embodiment. Since the configuration other than that of the light shielding portions 121-5a and 121-5b is similar to that in the first embodiment, the description thereof will not be repeated.

As a result of including the light shielding portions 121-5 as in FIG. 12, it is possible to reduce the visibility of the light shielding pattern (light shielding portions) and the separation of light beams when voltage is not applied while efficiently blocking light when voltage is applied.

Moreover, in a case of voltage driving in which the voltage is changed from high voltage to low voltage, for example, curved disclination is likely to occur. In such case, it is possible to further improve the light use efficiency by providing dot-like light shielding portions to correspond to the curved disclination.

MODIFIED EXAMPLE 4

Figure 13:
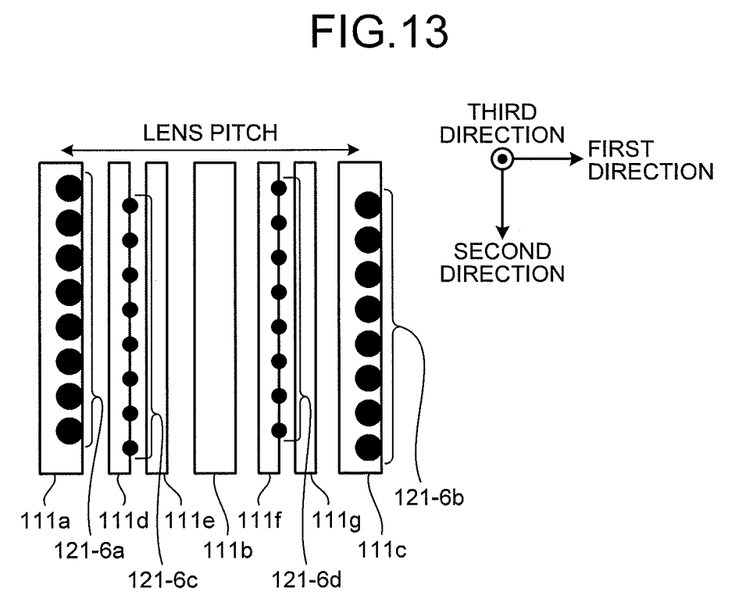
FIG. 13 is a configuration diagram of a light shielding portion of an embodiment according to a modified example 4.

FIG. 13 is a diagram illustrating an example of a configuration of light shielding portions 121-6a to 121-6d of an embodiment according to a modified example 4. In the present modified example, first electrodes 111d and 111e are arranged between first electrodes 111a and 111b, and first electrodes 111f and 111g are arranged between first electrodes 111b and 111c. In addition, the light shielding portions 121-6a and 121-6b are formed similarly to those in FIG. 12.

In the present modified example, however, dot-like light shielding portions (light shielding portions 121-6c and 121-6d) are also provided at the electrodes (first electrodes 111d and 111f) arranged at positions shifted toward the lens center from lens ends in addition to the lens end electrodes (first electrodes 111a and 111c). In this case, the size of dots of the light shielding portions 121-6c and 121-6d corresponding to the electrodes (first electrodes 111d and 111f) nearer to the lens center may be made smaller than that of those corresponding to the lens end electrodes according to the rate of occurrence of disclination.

With such a configuration, stray light can be efficiently reduced in a case where multiple electrodes are used for the first electrodes 111 and in a case of disclination divided into two.

MODIFIED EXAMPLE 5

Figure 14:
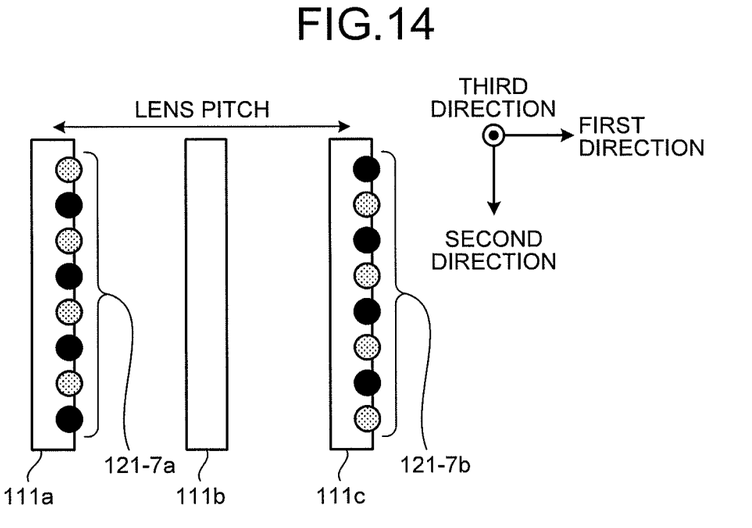
FIG. 14 is a configuration diagram of a light shielding portion of an embodiment according to a modified example 5.

FIG. 14 is a diagram illustrating an example of a configuration of light shielding portions 121-7a and 121-7b of an embodiment according to a modified example 5. In the present modified example, the transmittances of dots constituting the light shielding portions 121-7a and 121-7b vary. In FIG. 14, black dots represent dots having a low transmittance and gray dots represents dots having a high transmittance. The dots having different transmittances are arranged to correspond to a disclination occurrence pattern, for example. While an example in which dots with two transmittance values are included is illustrated in FIG. 14, light shielding portions including dots having three or more different transmittance values may be used.

Alternatively, dots may be configured such that the transmittance of each dot is equal but the density of the dots along the second direction is varied. Still alternatively, dots may be configured such that the transmittance of each dot is equal but the size of the dots is varied along the second direction.

With such a configuration as in the present modified example, stray light due to curved disclination as illustrated in FIG. 5, for example, can be efficiently reduced.

MODIFIED EXAMPLE 6

Figure 15:
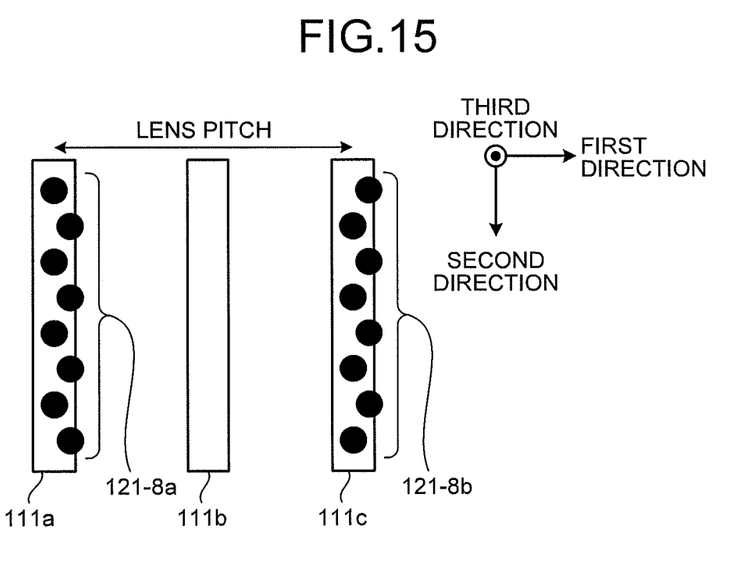
FIG. 15 is a configuration diagram of a light shielding portion of an embodiment according to a modified example 6.

FIG. 15 is a diagram illustrating an example of a configuration of light shielding portions 121-8a and 121-8b of an embodiment according to a modified example 6. In the present modified example, dots constituting the light shielding portions 121-8a and 121-8b are arranged in a zigzag manner. Curved disclination may occur in a zigzag manner as illustrated in FIG. 5. According to the present modified example, stray light due to such disclination can be efficiently reduced.

Fourth Embodiment

Figure 16:
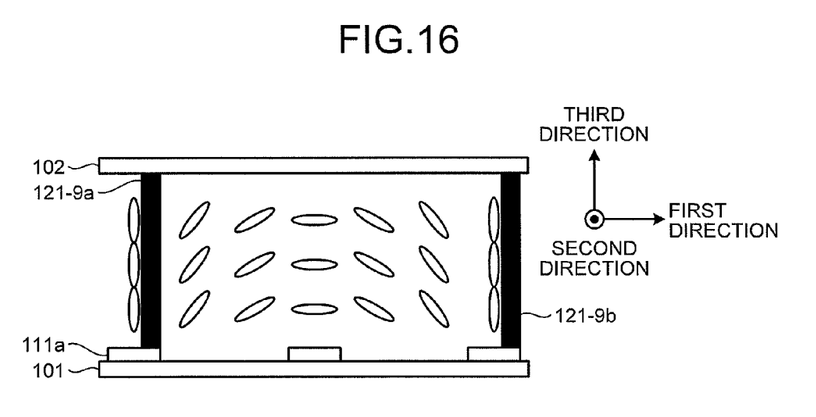
FIG. 16 is a configuration diagram of a light shielding portion of a fourth embodiment.

In a fourth embodiment, light shielding portions also serving as gap control members for the liquid crystal layer 130 are provided. FIG. 16 is a diagram illustrating an example of a configuration of light shielding portions 121-9a and 121-9b according to the fourth embodiment. Since the configuration other than that of the light shielding portions 121-9a and 121-9b is similar to that in the first embodiment, the description thereof will not be repeated.

The light shielding portions 121-9a and 121-9b also serving as gap control members are constituted by black beads arranged near lens end electrodes, for example. Alternatively, acrylic or metal ribs may be set instead of the beads. With such a configuration, it is possible to reduce stray light more easily and to realize gap control of the liquid crystal layer 130.

Fifth Embodiment

Figure 17:
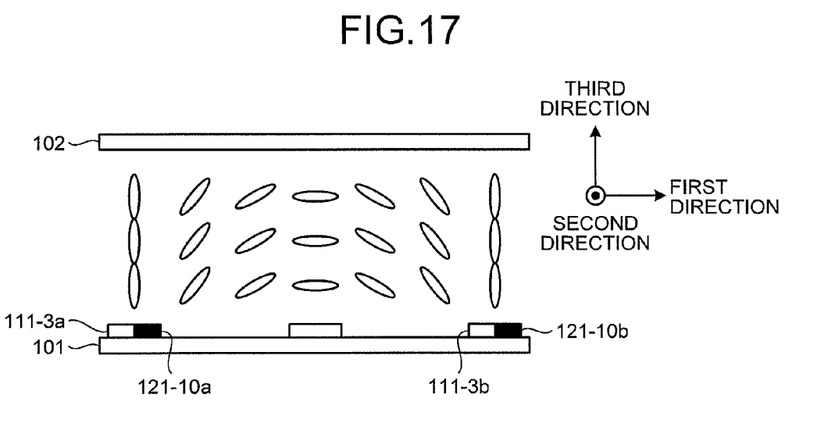
FIG. 17 is a configuration diagram of a light shielding portion of a fifth embodiment.

In a fifth embodiment, light shielding portions also serving as electrodes are provided. FIG. 17 is a diagram illustrating an example of a configuration of light shielding portions 121-10a and 121-10b according to the fifth embodiment. As illustrated in FIG. 17, in an optical element according to the fifth embodiment, lens end electrodes are constituted by a first electrode 111-3a and the light shielding portion 121-10a and by a first electrode 111-3b and the light shielding portion 121-10b. Since the other configuration is similar to that in the first embodiment, the description thereof will not be repeated.

The first electrodes 111-3a and 111-3b are transparent electrodes, for example. The light shielding portions 121-10a and 121-10b are metal electrodes having a lower transmittance than the transparent electrodes, for example. With such a configuration, it is possible to efficiently reduce stray light and to facilitate control of an electric field.

As described above, according to the first to fifth embodiments, it is possible to reduce stray light caused by disclination at high light use efficiency and to reduce 3D crosstalk. Moreover, since the light beam separation characteristics are reduced in 2D display, it is possible to improve the 2D image quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical device comprising:
a first substrate;
a second substrate;
a liquid crystal layer provided between the first substrate and the second substrate;
a plurality of first electrodes provided on the first substrate and arranged in a first direction, each first electrode extending along a second direction;
a second electrode provided on the second substrate; and
a light shielding portion configured to shield light and provided between the first substrate and the second substrate to overlap with a first one of the first electrodes when viewed from a third direction being vertical to a first substrate, the light shielding portion covering an area smaller than an area of the first one of the first electrodes.

2. The device according to claim 1, wherein
a light shielding center representing a center position in the first direction of the light shielding portion is different from an electrode center representing a center position in the first direction of the first one of the first electrodes.

3. The device according to claim 2, wherein
the light shielding center is shifted from the electrode center toward a direction nearer to a pretilt direction of liquid crystal molecules inside the liquid crystal layer out of the first direction and a direction opposite to the first direction.

4. The device according to claim 1, wherein
a width of the light shielding portion in the first direction is smaller than a width of the first one of the first electrodes in the first direction.

5. The device according to claim 1, wherein
the light shielding portion is a first light shielding portion, the device further including a second light shielding portion, the second light shielding portion being provided between the first substrate and the second substrate to overlap with a second one of the first electrodes when viewed from the third direction, the second light shielding portion covering an area smaller than an area of the second one of the first electrodes; and
the first and second light shielding portions have different transmittances from each other.

6. The device according to claim 5, wherein
the first light shielding portion has a lower transmittance than the second light shielding portion; and
the first one of the first electrodes is provided at a position to which a higher voltage than the second one of the first electrodes is applied.

7. The device according to claim 1, wherein
the light shielding portion is formed so that the transmittance continuously or gradually varies.

8. The device according to claim 1, wherein
the light shielding portion includes a plurality of dot-like light shielding portions.

9. The device according to claim 1, wherein
the light shielding portion includes a plurality of dot-like light shielding portions having different transmittances from each other.

10. The device according to claim 1, wherein
the light shielding portion is provided at a position overlapping with a first electrode to which a highest voltage is applied as viewed in the third direction among the first electrodes.

11. The device according to claim 1, wherein
the light shielding portion is provided at at least one of a position nearer to the first substrate than the second substrate and a position nearer to the second substrate than the first substrate.

12. The device according to claim 1, wherein
the light shielding portion is in contact with the first electrodes and the second substrate.

13. An image display device comprising:
the optical device according to claim 1; and
a display unit configured
to be provided on a back face of the optical device and to display images.

14. The image display device according to claim 13, further comprising a voltage control unit configured to control a voltage applied to the first electrodes.

15. The device according to claim 1, wherein
the light shielding portion is a first light shielding portion;
the device further includes a second light shielding portion, the second light shielding portion being provided between the first substrate and the second substrate to overlap with a second one of the first electrodes when viewed from the third direction, the second light shielding portion covering an area smaller that an area of the second one of the first electrodes; and
a third one of the first electrodes is disposed between the first one and the second one of the first electrodes, there being no light shielding portion overlapping the third one of the first electrodes.

16. The device according to claim 6, wherein
a third one of the first electrodes is disposed closer to the second one of the first electrodes than to the first one of the first electrodes, there being no light shielding portion overlapping the third one of the first electrodes.

17. The device according to claim 1, wherein widths of the first electrodes vary in the first direction.

18. The device according to claim 17 wherein lengths of the first electrodes are substantially constant in the second direction.

\* \* \* \* \*